United States Patent [19]

Shallenberger et al.

[11] Patent Number: 4,738,821
[45] Date of Patent: Apr. 19, 1988

[54] RECONSTITUTABLE NUCLEAR FUEL ASSEMBLY HAVING LOCKING TUBES WITH DIMPLES

[75] Inventors: John M. Shallenberger, Fox Chapel Borough; Stephen J. Ferlan, Wilkins Township, Allegheny County, both of Pa.

[73] Assignee: Westinghouse Electric Corp., Pittsburgh, Pa.

[21] Appl. No.: 30,005

[22] Filed: Mar. 23, 1987

[51] Int. Cl.⁴ .............................................. G21C 3/32
[52] U.S. Cl. ..................... 376/446; 376/353; 376/449
[58] Field of Search ...................... 376/446, 449, 353

[56] References Cited

U.S. PATENT DOCUMENTS

| | | | |
|---|---|---|---|
| 4,617,171 | 10/1986 | Feutrel | 376/446 |
| 4,631,168 | 12/1986 | Shallenberger | 376/446 |
| 4,641,409 | 2/1987 | Shallenberger | 376/446 |
| 4,684,498 | 8/1987 | Paul | 376/446 |
| 4,684,500 | 8/1987 | Gjertsen | 376/446 |

Primary Examiner—Donald P. Walsh

[57] ABSTRACT

In a reconstitutable nuclear fuel assembly, a top-nozzle-to-control-rod-guide-thimble attachment system employing a reusable locking tube having dimples. The guide thimble has longitudinal slots defining fingers therebetween. The fingers have rim (bulge) portions which engage a groove in the control rod passageway of the top nozzle adaptor plate for top-nozzle-to-guide-thimble attachment. The finger rim portions are prevented from moving radially inward, and thus leaving the groove, by a locking tube placed in the guide thimble. The locking tube has dimples at two elevations. The dimples interact with the other components of the attachment system to assure proper seating of the locking tube during locking tube installation and to assure against unintentional longitudinal movement of the locking tube during fuel assembly handling. An improperly seated locking tube complicates the underwater fuel assembly reconstitution operation.

12 Claims, 3 Drawing Sheets

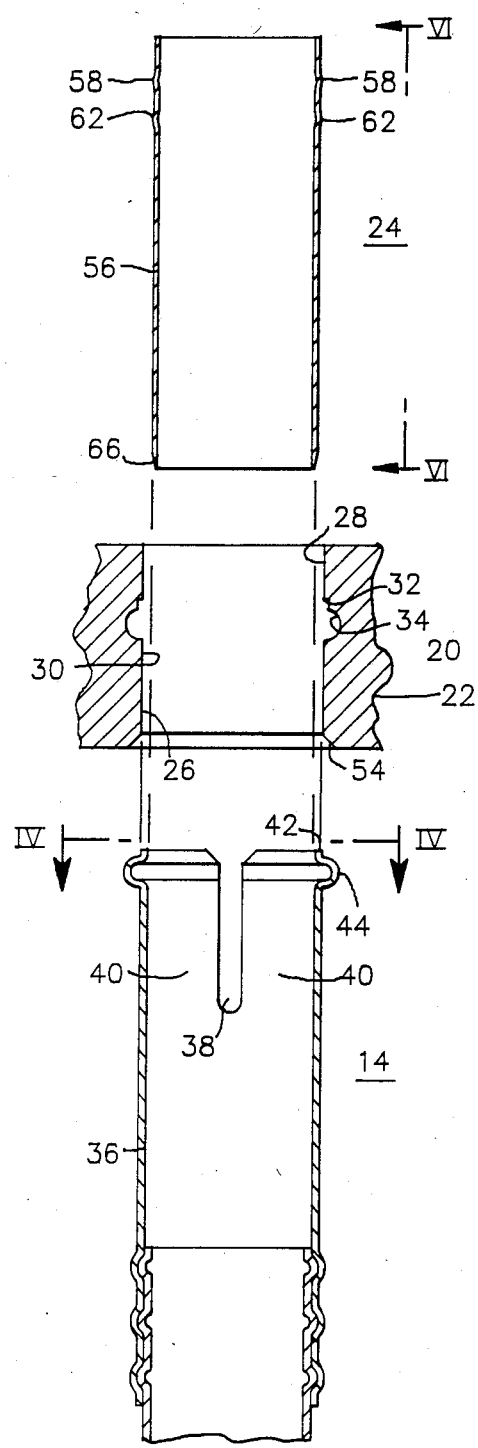
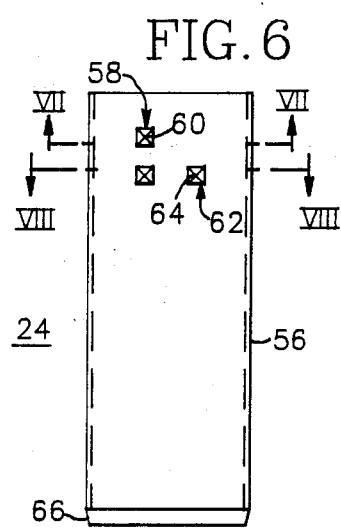
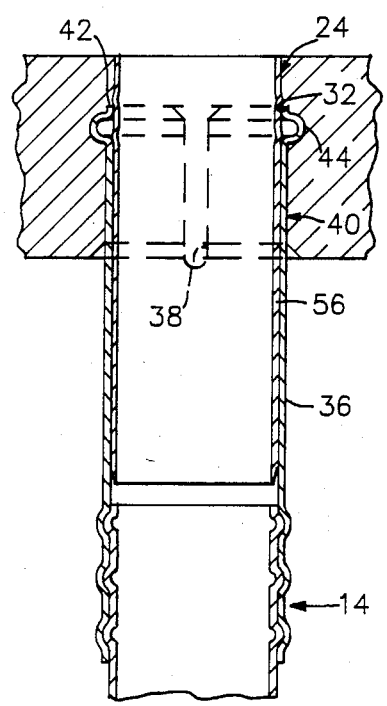

RECONSTITUTABLE NUCLEAR FUEL ASSEMBLY HAVING LOCKING TUBES WITH DIMPLES

CROSS REFERENCE TO RELATED APPLICATIONS

Reference is hereby made to the following copending applications dealing with related subject matter and assigned to the assignee of the present invention:

1. "Reusable Locking Tube in a Reconstitutable Fuel Assembly" by John M. Shallenberger et al., assigned U.S. Ser. No. 719,108 and filed Apr. 2, 1985 (W.E. 52,507).

2. "Improved Guide Thimble Captured Locking Tube in a Reconstitutable Fuel Assembly" by Robert K. Gjertsen et al., assigned U.S. Ser. No. 775,208 and filed Sept. 12, 1985 (W.E. 52,881).

BACKGROUND OF THE INVENTION

1. Field of the Invention

The present invention relates generally to reconstitutable fuel assemblies for nuclear reactors and, more particularly, is concerned with a reconstitutable nuclear fuel assembly having a top-nozzle-to-guide-thimble attachment system employing reusable locking tubes with preformed dimples.

2. Description of the Prior Art

In a typical nuclear reactor, the reactor core includes a large number of fuel assemblies each of which is composed of top and bottom nozzles with a plurality of elongated transversely spaced guide thimbles extending longitudinally between the nozzles and a plurality of transverse support grids axially spaced along and attached to the guide thimbles. Also, each fuel assembly is composed of a plurality of elongated fuel rods transversely spaced apart from one another and from the guide thimbles and supported by the transverse grids between the top and bottom nozzles. The fuel rods each contain fissile material and are grouped together in an array which is organized so as to provide a neutron flux in the core sufficient to support a high rate of nuclear fission. The reactor also has control rods which can be inserted into the guide thimbles to control the fission reaction. The fission reaction releases a large amount of energy in the form of heat. A liquid coolant is pumped upwardly through the core in order to extract some of the heat generated in the core for the production of useful work.

During operation in the nuclear reactor, the fuel rods may occassionally develop cracks along their lengths resulting primarily from internal stresses. These defective fuel rods must be replaced in the fuel assemblies, and this replacement must occur under water as the fuel assemblies become highly radioactive during their operation in the reactor. To gain access to a defective fuel rod, it is necessary to remove the top and/or bottom nozzle of the fuel assembly. Reconstitutable fuel assemblies exist which are designed with removable nozzles. Typical removable top (bottom) nozzles have been attached to the top (bottom) of the guide thimbles using a threaded arrangement. Typical removable top nozzles also have been attached to the top of the guide thimbles using a bulge/groove arrangement, including the use of locking tubes, such as disclosed in U.S. Pat. No. 4,631,168, hereby incorporated by reference.

Commonly owned U.S. patent application Ser. No. 719,108 entitled "Reusable Locking Tube in a Reconstitutable Fuel Assembly" by John M. Shallenberger et al., filed Apr. 2, 1985 (W.E. 52,507), is hereby incorporated by reference. The invention disclosed therein is a reconstitutable nuclear fuel assembly having reusable locking tubes with preformed dimples, and it has been in use and on sale in the U.S. for more than one year. Some locking tubes in those fuel assemblies were found to be seated too low. A study revealed that this problem had two possible causes. A properly seated locking tube could become improperly seated too low due to the force exerted on it when the fuel assembly was lifted, such as at the reactor site at the time of loading the fuel assembly into the reactor core. Also, a locking tube easily could be seated too low at the time of installation. A low-seated locking tube would require special (longer-handled) tooling for locking tube removal in the event the fuel assembly required reconstitution. This would complicate the underwater reconstitution operation.

What is needed in a removable locking tube design which would insure proper seating of the locking tube at the time of installation and after fuel assembly lifting, and which would avoid time-consuming measurement checks at the factory and at the reactor.

SUMMARY OF THE INVENTION

It is an object of the invention to provide a reconstitutable nuclear fuel assembly having a top-nozzle-to-control-rod-guide-thimble attachment system employing reusable locking tubes of a design which insures proper locking tube seating at the time of installation.

It is another object of the invention to provide such a locking tube design which also maintains proper locking tube seating during handling of the fuel assembly.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, the reconstitutable nuclear reactor fuel assembly top-nozzle-to-control-rod-guide-thimble attachment system includes a top nozzle, a control rod guide thimble, and a locking tube. The top nozzle's adaptor plate has a control rod passageway. The passageway's upper portion has a smaller diameter than its lower portion, and is joined thereto by a ledge portion. The lower portion includes a circumferential groove. The thimble's top portion has more than one longitudinal, open-ended slot. Between the slots are fingers having a radially outwardly projecting rim or bulge. The rim has an inside surface defining a recess including a bottom edge. The thimble top portion is coaxially disposed in the passageway with the finger ends longitudinally placed proximate the ledge portion and with the rim (bulge) portions transversely placed in the groove. The locking tube includes an annular flexible cylinder which is coaxially placed in the thimble's top portion. The cylinder has at least one upper embossed dimple with an apex placed at an elevation below and proximate the ledge portion. The cylinder also has at least two lower embossed dimples each with a tip placed at an elevation above and proximate the elevation of the bottom edge of the recess. The upper dimples project radially outward into the passageway's lower portion at a distance, from the cylinder's centerline, which is greater than half the passageway's upper portion's diameter. The lower dimples project radially outward into the recess at a distance, from the cylinder's centerline, which is greater than the difference between the thickness of a finger and half the passageway's lower portion's diameter. The lower dimples are spaced angularly apart such that when at least one of the lower dimples is angularly rotated to be placed in a slot, at least one of the other lower dimples is angularly oriented to be aligned with the inside surface of the rim of one of the fingers.

Another embodiment of the invention is the locking tube itself, the locking tube having been previously described within the context of the top-nozzle-to-control-rod-guide-thimble attachment system recounted in the previous paragraph.

Several benefits and advantages are derived from the invention. The upper dimple feature prevents upward movement of the locking tube. The lower dimple feature prevents downward movement of the locking tube. The upper and lower dimple features together provide for proper seating of the locking tube at installation and provide for maintaining such proper seating during fuel assembly handling.

BRIEF DESCRIPTION OF THE DRAWINGS

The invention will become more readily apparent from the following description of preferred embodiments thereof shown, by way of example only, in the accompanying drawings, wherein:

FIG. 2 is a sectioned, exploded view of the components, relating to one guide thimble, of the top-nozzle-to-control-rod-guide-thimble attachment system incorporated in FIG. 1;

FIG. 3 is a sectioned, assembled view of the components of the top-nozzle-to-control-rod-guide-thimble attachment system shown in FIG. 2;

FIG. 6 is a side elevational view of the reusable locking tube, as seen along arrows 6—6 of FIG. 2, showing the preformed dimples on a side of the tube;

DETAILED DESCRIPTION OF THE INVENTION

Figure 1:
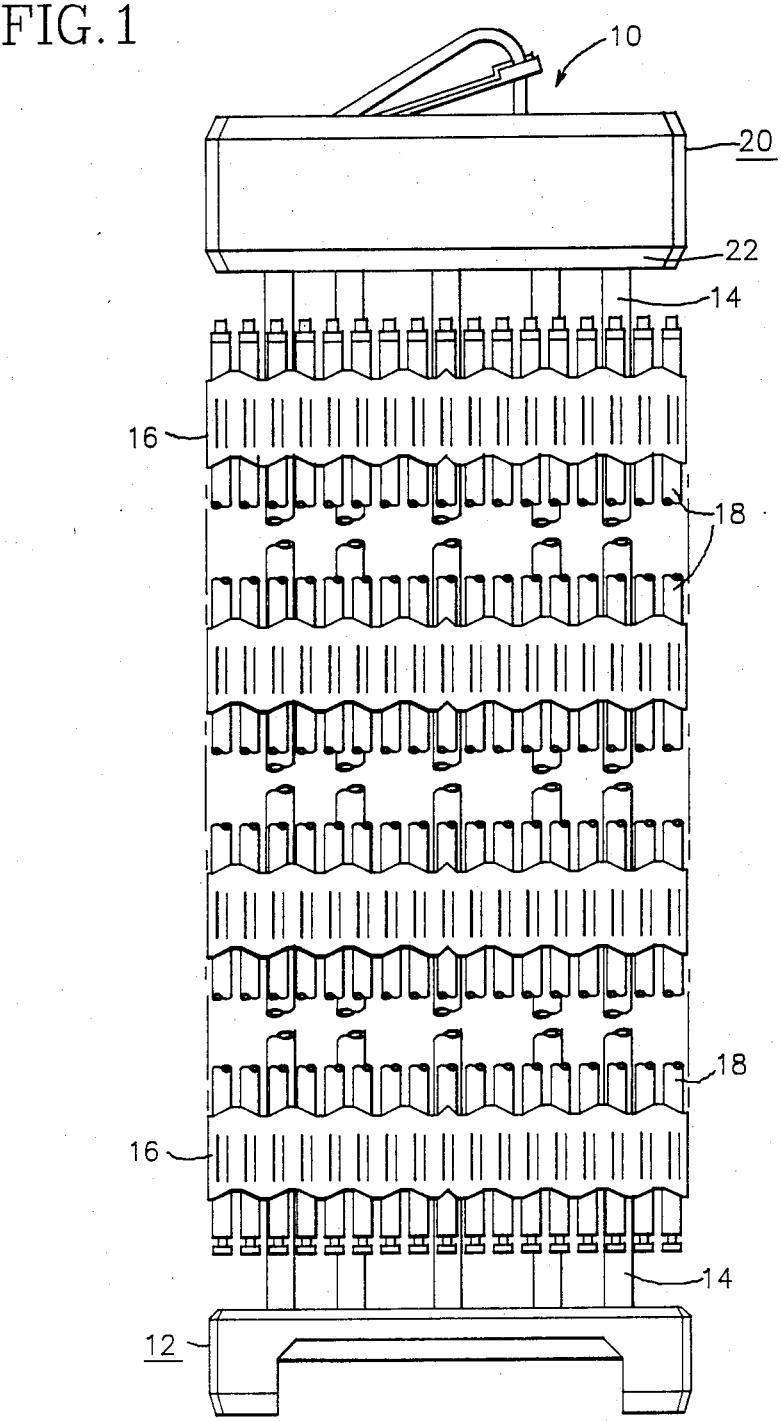
FIG. 1 is a vertically foreshortened elevational view of a reconstitutable nuclear reactor fuel assembly which incorporates the top-nozzle-to-control-rodguide-thimble attachment arrangement containing the locking tubes of the present invention.

Reference will now be made in detail to several present preferred embodiments of the invention, some examples of which are illustrated in the accompanying drawings. In the drawings, like reference characters designate like or corresponding parts throughout the several views.

In FIG. 1, a (typically 13.5 foot long) nuclear fuel assembly 10 is shown in vertically foreshortened form. The fuel assembly 10 is the type used in a pressurized water reactor (PWR) and basically includes a bottom nozzle 12 for supporting the assembly on the lower core plate (not shown) in the core region of a nuclear reactor (not shown), and a number (typically 24) of longitudinally extending (typically 12 foot long) guide thimbles 14 which project upwardly from the bottom nozzle 12. The fuel assembly 10 further includes a plurality of transverse grids 16 axially spaced along the guide thimbles 14 and an organized array of elongated fuel rods 18 transversely spaced and supported by the grids 16. The fuel assembly 10 also has a top nozzle 20 whose adaptor plate 22 is attached to the upper ends of the guide thimbles 14. The lower ends of the guide thimbles 14 are attached to the bottom nozzle 12. With such an arrangement of parts, the fuel assembly 10 forms an integral unit capable of being conventionally handled without damaging the assembly parts.

As mentioned above, the fuel rods 18 in the fuel assembly 10 are held in spaced relationship with one another by the grids 16 spaced along the fuel assembly length. Typically each fuel rod 18 contains nuclear fuel pellets of uranium dioxide (not shown). A liquid moderator/coolant, such as water or water containing boron, is pumped upwardly through the guide thimbles 14 and along the fuel rods 18 of the fuel assembly 10 in order to extract heat generated therein for the production of useful work. To control the fission process, a number of control rods (not shown) are reciprocally movable in the guide thimbles 14 located at predetermined positions in the fuel assembly 10.

The reconstitutable nuclear reactor fuel assembly top-nozzle-to-control-rod-guide-thimble attachment system of the invention, which is shown unassembled in FIG. 2 and assembled in FIG. 3, includes a removable top nozzle 20, a control rod guide thimble 14, and a locking tube 24. FIGS. 2 and 3 show only one guide thimble for clarity, it being understood that the attachment shown therein is repeated for all the guide thimbles shown in FIG. 1 to define the attachment system. The top nozzle's adaptor plate 22 has a control rod passageway 26 which includes a smaller diameter upper portion 28, a larger diameter lower portion 30, and a ledge portion 32 which joins the upper and lower portions. The lower portion 30 has a circumferential groove 34.

Figure 4:
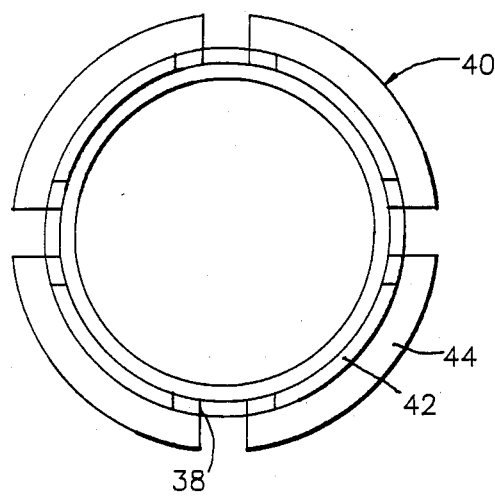
FIG. 4 is a top plan view, as seen along arrows 4—4 of FIG. 2, looking down on the top portion of the control rod guide thimble.
Figure 5:
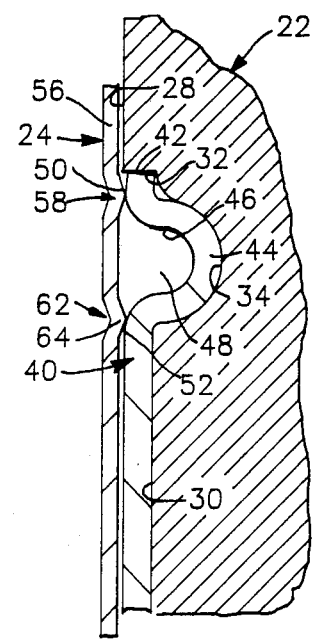
FIG. 5 is an enlarged view of a portion of FIG. 3 showing how the dimples secure the locking tube in proper position.

The guide thimble 14, as best seen in FIGS. 2 and 4, has a top portion 36 with a plurality of longitudinal, open-ended slots 38 defining fingers 40 therebetween. The top portion 36 may be integral with, or an insert bulge-fitted to, the guide thimble 14. Preferably, there are four slots 38 and hence four fingers 40. Each finger 40 has an end 42 and a radially outwardly projecting preformed bulge or rim portion 44. As seen more clearly in FIGS. 3 and 5, each finger rim portion 44 includes an inside surface 46 defining a recess 48. The bottom edge 52 of the recess is taken as the location farthest from the finger's end 42 where the inside diameter of the guide thimble 14 first begins to increase to create the finger rim recess 48. When the top nozzle 20 is attached to the guide thimble 14, the top portion 36 of the guide thimble 14 is coaxially placed in the passageway 26 such that the ends 42 of the fingers 40 are longitudinally positioned proximate the ledge portion 32 with the rim portions 44 of the fingers 40 transversely positioned in the groove 34. This is accomplished by inserting the adaptor plate 22 on top of the preferably outwardly biased flexible fingers 40 where a lead-in chamfer 54 on the adaptor plate 22 compresses the fingers 40 to allow entry of the guide thimble 14 into the passageway 26, with the fingers 40 radially opening up to their outwardly biased position when they reach and engage the groove 34 of the passageway 26.

Figure 7:
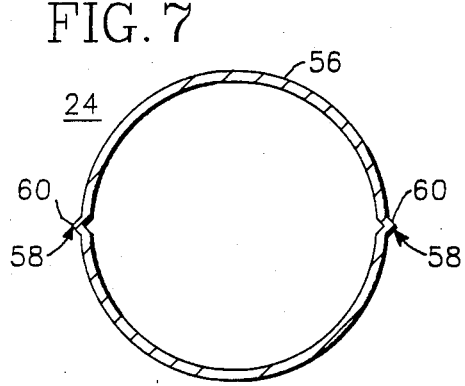
FIG. 7 is a sectional plan view of the locking tube, as seen along arrows 7—7 of FIG. 6, showing a pair of upper embossed dimples.
Figure 8:
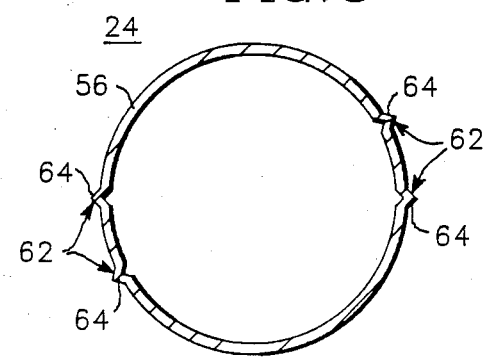
FIG. 8 is a sectional plan view of the locking tube, as seen along arrows 8—8 of FIG. 6, showing two pair of lower embossed dimples.

The locking tube 24, as seen alone in FIGS. 6, 7, and 8, includes an annular flexible cylinder 56 which has at least one upper embossed dimple 58 with an apex 60 and at least two-angularly-spaced-apart lower embossed dimples 62 each with a tip 64. When the top nozzle 20 is attached to the guide thimble 14, the cylinder 56 is coaxially placed in the top portion 36 of the guide thimble 14. For an installed cylinder 56, the apex 60 of the upper embossed dimple 58 is located at an elevation below and proximate the ledge portion 32 of the passageway 26 and the tips 64 of the lower embossed dimples 62 are located at an elevation above and proximate the elevation of the bottom edge 52 of the recess 48 of the fingers 40. Also, for the installed cylinder 56, the apex 60 of the upper dimple 58 projects radially outward into the lower portion 30 of the passageway 26 at a distance, from the centerline of the cylinder 56, which is greater than half the diameter of the upper portion 28 of the passageway 26. This projection is made possible by creating a space, either by choosing dimensions, with respect to the rim/groove engagement, such that the finger end 42 is spaced apart from the ledge portion 32 or by making the finger thickness less than the ledge portion width. Furthermore, for the installed cylinder 56, the tips 64 of the lower dimples 62 project radially outward into the recess 48 at a distance, from the centerline of the cylinder 56, which is greater than the difference between the thickness of a finger 40 and half the diameter of the lower portion 30 of the passageway 26 (i.e., lower portion radius minus finger thickness). Finally, for the installed cylinder 56, the lower dimples 62 are angularly spaced apart such that when at least one of the lower dimples 62 is angularly rotated to be placed in a slot 38, at least one other of the lower dimples 62 is angularly oriented to be aligned with the inside surface 46 of the rim portion 44 of one of the fingers 40 of the guide thimble 14.

The installation of the locking tube 24 is accomplished by inserting it with sufficient force into the top of the guide thimble 14 after the removable top nozzle 20 has been installed on the guide thimble. Entry is assisted by a lead-in taper 66 on the locking tube 24. As the locking tube 24 enters the passageway 26, the cylinder 56 itself flexibly deforms to allow passage of the upper and lower embossed dimples 58 and 62. It is noted that the locking tube's flexibility is such that while it will allow intended installation and removal by flexing under such predetermined forces, it will not flex under any frictional forces encountered by withdrawal of a control rod, thimble plug, etc. from the guide thimble. When the cylinder 56 reaches its proper seating depth in the passageway 26, the upper dimple 58 will radially outwardly project beneath the ledge portion 32, and at least one of the lower dimples 62 will radially outwardly project into a recess 48. This condition is readily determined at installation by noting the increased force necessary to longitudinally move the locking tube 24 up or down when it is at its properly seated location. The previously described apex and tip projecting distances are such that the upper dipmle 58 will longitudinally engage the ledge portion 32 of the passageway 28 with sufficient force to prevent any unintentional raising of the locking tube 24, and at least one of the lower dimples 62 will longitudinally engage a finger 40 which transversely engages the bottom of the groove 34 all with sufficient force to prevent any unintentional lowering of the locking tube 24 with respect to the adaptor plate 22 (even though the finger 40, through its rim/groove engagement, may experience some longitudinal movement with respect to the adaptor plate due to fuel assembly 10 handling). The presence of the locking tube 24 prevents the unintentional removal of the top nozzle 20 from the guide thimble 14 by preventing the fingers 40 from moving radially inward under a longitudinal force which would otherwise cause the rim (bulge) portions 44 to disengage from the groove 34 resulting in top nozzle 20 removal. To remove the installed locking tube 24, sufficient force is exerted to overcome the dimple engagement to flexibly deform the reusable locking tube 24 to allow its withdrawal from the passageway 26, as is known to those skilled in the art.

The dimples 58 and 62 may be formed by an inner/outer die operation, as is within the purview of those skilled in the art. Preferably, the locking tube 24 has two upper dimples 58 and four lower dimples 62. To assist the cylinder 56 to flexibly deform during locking tube 24 installation/removal, an exemplary design has lower dimples 62 consisting of a first generally-diametrically-opposed pair and a second generally-diametrically-opposed pair, wherein the second pair of lower dimples 62 is oriented between ten and forty-five degrees, inclusive, (and preferably generally thirty degrees) from the first pair of lower dimples 62 (see FIG. 8). Also, in this design, the upper dimples 58 consist of a generally-diametrically-opposed pair (see FIG. 7), and this pair of upper dimples 58 is generally angularly aligned with the first or second pair of lower dimples 62 (see FIG. 6).

A typical locking tube 24 is made of stainless steel and has a length of 1.25 inches, an inside diameter of 0.45 inch, and a thickness of 15 thousandths of an inch. The dimples (raised dots) 58 and 62 typically are diamond shaped having a square base with a side having a length of 25 thousandths of an inch and having an apex 60 or tip 64 having a height of 5 thousandths of an inch. The upper dimples 58 typically are longitudinally spaced 0.13 inch from the top of the locking tube 24 and 0.11 inch from the lower dimples 62. A locking tube 24 recessed more than 0.03 inch from the top of the adaptor plate 22 typically is considered to be seated too low.

It will be apparent that many modifications and variations are possible in light of the above teachings. For example, although outwardly biased fingers 40 are preferred, the locking tube 24 may be used with non-outwardly-biased fingers whereby locking tube insertion forces the fingers apart through the action of suitably tapered surfaces, as can be appreciated by those skilled in the art. Also, though preformed dimples 58 and 62 are favored, the attachment system could be used for a particular application wherein the dimples are formed after the locking tube is inserted into the guide thimble. It, therefore, is to be understood that within the scope of the appended claims, the invention may be practiced other than as specifically described.

We claim:

1. In a reconstitutable nuclear reactor fuel assembly, a top-nozzle-to-control-rod-guide-thimble attachment system comprising:
   (a) a top nozzle with an adaptor plate having a control rod passageway with a smaller diameter upper portion, a larger diameter lower portion having a circumferential groove, and a ledge portion joining said upper and lower portions;
   (b) a control rod guide thimble having a top portion with a plurality of longitudinal, open-ended slots defining fingers therebetween, said fingers each having an end, a thickness, and a radially outwardly projecting rim portion with an inside surface defining a recess including a bottom edge, said top portion of said guide thimble coaxially disposed in said passageway with said ends of said fingers longitudinally disposed proximate said ledge portion and said rim portions of said fingers transversely disposed in said groove; and
   (c) a locking tube including a flexible, annular cylinder coaxially disposed in said top portion of said guide thimble, said cylinder having a centerline and at least one upper embossed dimple with an apex disposed at an elevation below and proximate said ledge portion of said passageway and projecting radially outward into said lower portion of said passageway at a distance, from the centerline of said cylinder, which is greater than half the diameter of said upper portion of said passageway, said cylinder also having at least two lower embossed dimples each with a tip disposed at an elevation above and proximate that of said bottom edge of said recess of said fingers and projecting radially outward into said recess at a distance, from the centerline of said cylinder, which is greater than the difference between the thickness of a said finger and half the diameter of said lower portion of said passageway, said lower embossed dimples angularly spaced apart such that when at least one of said lower embossed dimples is angularly rotated to be disposed in a said slot, at least one other of said lower embossed dimples is angularly oriented to be aligned with said inside surface of said rim portion of one of said fingers of said guide thimble.

2. The nuclear reactor fuel assembly of claim 1, wherein said top portion of said guide thimble has four said fingers and said locking tube has two said upper embossed dimples and four said lower embossed dimples.

3. The nuclear reactor fuel assembly of claim 2, wherein said lower embossed dimples consist of a first generally-diametrically-opposed pair and a second generally-diametrically-opposed pair with said second pair of said lower embossed dimples oriented between ten and forty-five degrees, inclusive, from said first pair of said lower embossed dimples.

4. The nuclear reactor fuel assembly of claim 3, wherein said second pair of said lower embossed dimples is oriented generally thirty degrees from said first pair of said lower embossed dimples.

5. The nuclear reactor fuel assembly of claim 4, wherein said upper embossed dimples consist of a generally-diametrically-opposed pair.

6. The nuclear reactor fuel assembly of claim 5, wherein said pair of said upper embossed dimples is generally angularly aligned with one of said first and second pairs of said lower embossed dimples.

7. A locking tube for a reconstitutable nuclear reactor fuel assembly top-nozzle-to-control-rod-guide-thimble attachment system of the type which employs a top nozzle with an adaptor plate having a control rod passage-way with a smaller diameter upper portion, a larger diameter lower portion having a circumferential groove, and a ledge portion joining said upper and lower portions; and which also employs a control rod guide thimble having a top portion with a plurality of longitudinal, open-ended slots defining fingers therebetween, said fingers each having an end, a thickness, and a radially outwardly projecting rim portion with an inside surface defining a recess including a bottom edge, said top portion of said guide thimble coaxially disposed in said passageway with said ends of said fingers longitudinally disposed proximate said ledge portion and said rim portions of said fingers transversely disposed in said groove; said locking tube comprising: a flexible, annular cylinder coaxially disposable in said top portion of said guide thimble, said cylinder having a centerline and at least one upper embossed dimple with an apex disposable at an elevation below and proximate said ledge portion of said passageway and radially outwardly projectable into said lower portion of said passageway at a distance, from the centerline of said cylinder, which is greater than half the diameter of said upper portion of said passageway, said cylinder also having at least two lower embossed dimples each with a tip disposable at an elevation above and proximate that of said bottom edge of said recess of said fingers and radially outwardly projectable into said recess at a distance, from the centerline of said cylinder, which is greater than the difference between the thickness of a said finger and half the diameter of said lower portion of said passageway, said lower embossed dimples angularly spaced apart such that when at least one of said lower embossed dimples is angularly rotated to be disposed in a said slot, at least one other of said lower embossed dimples is angularly oriented to be aligned with said inside surface of said rim portion of one of said fingers of said guide thimble.

8. The locking tube of claim 7, wherein said cylinder has two said upper embossed dimples and four said lower embossed dimples.

9. The locking tube of claim 8, wherein said lower embossed dimples consist of a first generally-diametrically-opposed pair and a second generally-diametrically-opposed pair with said second pair of said lower embossed dimples oriented between ten and forty-five degrees, inclusive, from said first pair of said lower embossed dimples.

10. The locking tube of claim 9, wherein said second pair of said lower embossed dimples is oriented generally thirty degrees from said first pair of said lower embossed dimples.

11. The locking tube of claim 10, wherein said upper embossed dimples consist of a generally-diametrically-opposed pair.

12. The locking tube of claim 11, wherein said pair of said upper embossed dimples is generally angularly aligned with one of said first and second pairs of said lower embossed dimples.

* * * * *